United States Patent Office 3,404,104
Patented Oct. 1, 1968

3,404,104
POLYOLEFIN FOAM
George R. Hill, Bartlesville, and Donald G. Needham, Ramona, Okla., assignors to Phillips Petroleum Company, a corporation of Delaware
No Drawing. Filed Dec. 21, 1964, Ser. No. 420,153
5 Claims. (Cl. 260—2.5)

ABSTRACT OF THE DISCLOSURE

A foamable composition formed by first blending a polyolefin resin and dispersing agent, and thereafter adding a temperature control agent and a blowing agent. A method of producing polyolefin foam by foaming the above mixture.

---

This invention relates to a method of producing polyolefin foam. In another aspect, the invention relates to a composition useful for the production of such foam.

Foams have been produced of a number of polyolefin resins. The essential ingredients for such a product include the resin and a blowing agent. Sometimes a cross-linking agent is included in the composition.

To produce foam, the desired ingredients are blended by melting the polymer with the additives in a closed system such as a Banbury mixer, an extruder, a pressure kettle, etc. Foaming takes place when the mixture is released from the closed system. Frequently, preliminary mixing in an open vessel is carried out.

An object of this invention is to provide a new method of producing polyolefin foam. A further object is to provide a new foam producing composition. A further object is to produce a process of producing polyethylene foam characterized by a small, uniform cell structure as determined by visual examination.

Broadly, the invention resides in a process for producing polyolefin resin foam which comprises dry blending, based on 100 parts by weight of resin, 0.05 to 0.5 part of a material selected from the group consisting of mineral oil, dioctylphthalate, and liquid polyisobutylene; subsequently a temperature control agent; and a blowing agent; and extruding the mixture thereby foaming the same, said foam being characterized by small, uniform cell structure.

Another aspect of the invention resides in the composition produced by mixing the ingredients.

The mineral oil can be any paraffinic, naphthenic, or aromatic petroleum oil. It should be a normally liquid product and preferably has a viscosity in the range of 200 to 600 S.U. at 100° F. (ASTM D87–57). The liquid polyisobutylene should have a molecular weight in the range of 500 to 5000, preferably 1000 to 3000. We have obtained especially good results using a 50/50 mixture on a volume basis of the liquid polymers of 1000 and 3000 molecular weight.

Prior workers in the art have suggested, by generic and specific language, a great many additives for the production of foam. However, each material behaves somewhat differently and the search for improved foam continues.

The invention is applicable to the various polyolefin resins now available. These include high and low density polyethylenes, polypropylenes, polymers of the higher olefins, copolymers of two or more olefins such as ethylene/propylene copolymers, ethylene/1-butene copolymers, ethylene/propylene/dicyclopentadiene rubbers, etc.

The blowing agents employed, which preferably decompose with the liberation of gaseous material at a temperature of 300 to 700° F. are known to those skilled in the art. Specific examples are azodicarbonamide, 4,4-oxybis(benzenesulfonyl hydrazide), dinitrosopentamethylenetetramine, diazoaminobenzene, etc. Based on 100 parts by weight of the resin, 0.2 to 2 parts of blowing agent are generally used.

Promoters or retarders are incorporated in the mixture. Such tempeature control agents decrease or increase, respectively, the temperature at which the blowing agent decomposes. Specific examples of these materials suitable in the present invention are zinc oxide, barium stearate and magnesium oxide. The amount is 0.2 to 4 parts per part of blowing agent.

Another essential ingredient of the composition is mineral oil, dioctylphthalate, or liquid polyisobutylene. Mixtures of liquid additives can be used.

The blending time is not critical. It must be sufficient to get a good dispersion of additives used. A time of 5 to 30 minutes is generally satisfactory with 10 to 20 minutes used in most of our work. However, it is important that the liquid, the mineral oil, dioctylphthalate, or liquid polyisobutylene be added prior to the blowing agent and promoter or retarder. Poor foam results in the materials are all added at the same time. Thereafter the mixture is extruded in conventional equipment.

The following examples set forth specific embodiments of our invention. They should not be considered unduly limiting.

EXAMPLE I

Using the following recipe, a foamed wire coating was prepared. The resin was an ethylene/1-butene copolymer of 0.950 density (ASTM D1505–60T) and 0.3 melt index (ASTM D1238–62T).

| | Parts by weight |
|---|---|
| Resin | 100 |
| Dioctylphthalate | 0.1 |
| Azodicarbonamide | 0.2 |
| Zinc oxide | 0.4 |

The resin in pellet form and the dioctylphthalate were dry blended for 5 minutes. The blowing agent and zinc oxide were added and the mixture tumbled another 10 minutes.

The mixture was coated onto wire using a wire coating extruder with a barrel temperature of 350° F., a die temperature of 400° F., a head pressure of 4000 p.s.i., and a wire speed of 1100 feet per minute. Wire coated with foam of excellent appearance resulted, the foam being characterized by small, uniform cell structure.

EXAMPLE II

The run of Example I was repeated except that the amount of blowing agent and zinc oxide were each increased to 0.5 part. The same excellent results were obtained.

EXAMPLE III

Using the polymer of Example I and the same mixing procedure, the following recipe was used for the production of foamed filament.

| | Parts by weight |
|---|---|
| Resin | 100 |
| Dioctylphthalate | 0.1 |
| Azodicarbonamide | 0.5 |
| Barium stearate | 0.25 |

Foamed filament was extruded from a 1½ inch extruder using a die temperature of 425° F. and a draw ratio of 11 to 1. The die had 10 holes each 0.042 inch in diameter. The filament was quenched in a water bath two inches from the die face. Excellent foamed filament resulted, the foam being characterized by small, uniform cell structure.

EXAMPLE IV

Example III was repeated using polypropylene of 0.905 density, the recipe and procedure being otherwise identical. Excellent foamed filament was produced.

EXAMPLE V

Polyethylene of 0.921 density and 3 melt index was used to produce foamed tubing using the following recipe and the procedure of Example I.

| | Parts by weight |
|---|---|
| Resin | 100 |
| Dioctylphthalate | 0.1 |
| Azodicarbonamide | 0.5 |
| Zinc oxide | 0.5 |

Using a tubing extruder, excellent foamed tubing was produced, the foam being characterized by small, uniform cell structure.

EXAMPLE VI

Using the polymer and procedure of Example I, coated wire was producing using the following recipe.

| | Parts by weight |
|---|---|
| Resin | 100 |
| Liquid polyisobutylene | 0.1 |
| Azodicarbonamide | 0.5 |
| Zinc oxide | 0.25 |

The liquid polyisobutylene was a mixture of equal parts by volume of liquid polyisobutylene of 1000 molecular weight and liquid polyisobutylene of 3000 molecular weight. Wire with an excellent foamed coating was obtained.

EXAMPLE VII

When mineral oil is substituted for the dioctylphthalate, the same results are obtained. The mineral oil had the following characteristics: USP Heavy White with a specific gravity of 0.880 and a viscosity of 356 S.U. at 100° F.

EXAMPLE VIII

Foamed filament was prepared according to the method of Example III using polypropylene of 0.905 density and the following recipe.

| | Parts by weight |
|---|---|
| Resin | 100 |
| Dioctylphthalate | 0.1 |
| Azodicarbonamide | 0.5 |
| Magnesium oxide | 0.25 |

Excellent foamed filament was obtained.

As many possible embodiments can be made of this invention without departing from the scope thereof, it is to be understood that all matter herein set forth is to be interpreted as illustrative and not as unduly limiting the invention.

What is claimed is:

1. A process for producing polyolefin resin foam which comprises dry blending, based on 100 parts by weight of polyolefin resin, 0.05 to 0.5 part of a material selected from the group consisting of mineral oil, dioctylphthalate, and liquid polyisobutylene; subsequently blending therewith 0.2 to 4 parts of a temperature control agent selected from the group consisting of zinc oxide, barium stearate, and magnesium oxide; and 0.2 to 2 parts of a blowing agent selected from the group consisting of azodicarbonamide, 4,4'-oxybis(benzenesulfonyl hydroxide), dinitrosopentamethylenetetramine, and diazoaminobenzene; and extruding the mixture thereby foaming the same, said foam being characterized by small, uniform cell structure.

2. A process for producing polyethylene foam which comprises blending, based on 100 parts by weight of polyethylene, 0.05 to 0.5 part of dioctylphthalate, subsequently blending therewith 0.2 to 2 parts of azodicarbonamide, and 0.2 to 4 parts of zinc oxide, and extruding the composition thereby foaming the same, said foam being characterized by a small, uniform cell structure.

3. A process for producing polyethylene foam which comprises blending, based on 100 parts by weight of polyethylene, 0.05 to 0.5 part of mineral oil, subsequently blending therewith 0.2 to 2 parts of azodicarbonamide, and 0.2 to 4 parts of zinc oxide, and extruding the composition thereby foaming the same, said foam being characterized by a small, uniform cell structure.

4. A process for producing polyolefin foam which comprises blending, based on 100 parts by weight of said polyethylene, 0.05 to 0.5 parts of polyisobutylene, subsequently blending therewith 0.2 to 2 parts of azodicarbonamide, and 0.02 to 4 parts of zinc oxide, and extruding the composition thereby foaming same, said foam being characterized by a small, uniform cell structure.

5. The process of claim 1 wherein said polyolefin resin is polyethylene, polypropylene, or a copolymer of ethylene and 1-butene.

References Cited

UNITED STATES PATENTS

| 2,819,231 | 1/1958 | Hahn et al. | 260—2.5 |
| 2,945,827 | 7/1960 | Henning | 260—2.5 |
| 2,945,828 | 7/1960 | Henning | 260—2.5 |
| 2,960,482 | 11/1960 | Henning | 260—2.5 |
| 3,017,371 | 1/1962 | Hohenberg et al. | 260—2.5 |
| 3,098,832 | 7/1963 | Pooley et al. | 260—2.5 |
| 3,118,161 | 1/1964 | Cramton | 260—2.5 |

FOREIGN PATENTS 903,564   8/1962   Great Britain.

OTHER REFERENCES

Buttrey, Plasticizers, Cleaver Hume Press, London, 1957, p. 13.

MURRAY TILLMAN, *Primary Examiner.*

M. J. TULLY, *Assistant Examiner.*